United States Patent [19]

Niknafs et al.

[11] Patent Number: 5,304,423
[45] Date of Patent: Apr. 19, 1994

[54] PACKING ELEMENT

[75] Inventors: Hassan Niknafs, Stow; Henry G. Lex, Jr., Hudson, both of Ohio

[73] Assignee: Norton Chemical Process Products Corp., Worcester, Mass.

[21] Appl. No.: 13,675

[22] Filed: Feb. 4, 1993

Related U.S. Application Data

[63] Continuation-in-part of Ser. No. 914,671, Jul. 16, 1992, abandoned.

[51] Int. Cl.⁵ ............................................. F02M 17/28
[52] U.S. Cl. .................................. 428/402; 428/36.9; 261/94; 261/DIG. 72; 210/150
[58] Field of Search ................. 428/402, 65, 66, 34.4, 428/36.9; 261/94, DIG. 72; 210/150

[56] References Cited

U.S. PATENT DOCUMENTS

| 2,172,714 | 9/1939 | Schack et al. | 263/51 |
| 4,086,307 | 4/1978 | Glaspie | 261/DIG. 72 |
| 4,333,893 | 6/1982 | Clyde | 261/94 |

Primary Examiner—Alexander S. Thomas
Attorney, Agent, or Firm—David Bennett

[57] ABSTRACT

Mass transfer elements with an essentially four-lobed cylindrical configuration are particularly effective random dumped packing elements for mass transfer towers, providing a combination of high surface area and low pressure drop.

6 Claims, 2 Drawing Sheets

PACKING ELEMENT

This is a continuation-in-part of copending application Ser. No. 07/914,671, filed on Jul. 16, 1992, now abandoned.

BACKGROUND OF THE INVENTION

This invention relates to packing elements for use in chemical process equipment. It relates specifically to random packing elements of a novel and advantageous design useful in mass transfer applications.

"Mass transfer" has been defined as the transfer of one or more components from one immiscible phase to another. This "component" may be a chemical or it may be heat. In the case in which the component is heat this may be combustion heat or reaction heat that needs to be removed from a reaction stream before further processing, or from a hot stream of fluid before it can be collected or used. The component can also be a chemical such as a gas component to be removed from a gas stream by absorption, or a component of a liquid mixture to be treated by a distillation or separation process. For such applications and a plurality of other applications involving mass transfer, it is conventional to pass the fluid to be treated through a column containing randomly disposed packing elements. These elements are hereinafter referred to as mass transfer elements for simplicity, regardless of the actual process in connection with which they are actually designed to be used.

Clearly the most efficient mass transfer elements are those that present the largest surface area to the fluid for contact. There have therefore been many attempts to design random packing elements with this surface area feature maximized. It is found however in practice that other characteristics are also extremely desirable. For example, it is also valuable if the elements do not nest together when in the column because this reduces the effective surface area exposure. It is also important that the elements do not pack so tightly as to restrict the fluid flow and generate a large pressure drop between the entrance and exit of the column.

The balancing of these often competing requirements to produce an effective mass transfer element is a matter of considerable skill and involves compromises to achieve the optimum combination of properties.

DESCRIPTION OF THE INVENTION

A new design for a random packing mass transfer element has now been discovered that produces a very advantageous balance of desirable properties.

The mass transfer element of the invention comprises a generally tubular structure in which the tube wall has been inwardly deformed at opposed ends of mutually perpendicular diameters to provide a cross-section with four external lobes.

The inward deformations at opposite ends of each diameter are preferably of uniform amounts such that the convexity of the internal wall surface of each deformation has the same radius of curvature. The inward deformations at opposed ends of the perpendicular diameter are also equal in the radius of curvature of the inside wall surface but, in one preferred embodiment, preferably have a different radius of curvature from those of the depressions at the ends of the other diameter such that the four external lobes give the element cross-section the appearance of a bow-tie. The ratio of the two radii of curvature in this preferred embodiment may vary widely but is preferably from about 1:1 to about 4:1, and most frequently from about 2:1 to about 3:1. In an alternative form the radii of curvature of the two sets of internal convexities are the same but the angle subtended by the extremes of the convexity is greater for one opposed pair than for the other. In practical terms this means that the intrusion of the larger pair of convexities into the internal space of the element is greater than for the others. In an extreme form of this embodiment, the intrusion of the two larger opposed convexities is such that the opposed internal surfaces touch and the axial passage through the element is effectively divided into two.

In a second preferred embodiment, the radii of curvature of all inside surfaces of the four deformations are equal and the internal intrusions of all four are the same, so as to form an internal axial passage of essentially cruciform cross-section.

The axial length of the element can be any convenient amount but usually this is from about 0.5 cm to about 3 cm and preferably from about 1 cm to about 2 cm.

The greatest cross-sectional dimension is usually greater than the axial length and often from about 2 to about 6 times greater. Most frequently the greatest cross-sectional dimension is from about 2 to about 4 times the axial length.

The outer surface of the element comprises four convex lobes and these may be separated by concave surfaces corresponding to the convexities on the internal surfaces or by linking surfaces of little or no curvature in either direction. In general this latter type of connecting surface is preferred with elements having four lobes of equal size.

Where the lobes are separated by concave surfaces, these concavities may be provided with ribs extending axially along the length of the element. In a preferred construction there are from about 2 to about 6, and more preferably, from 3 to 4 ribs in each concavity and most preferably in only the concavities with the greater radius of curvature.

In addition, especially with the "bow-tie" configuration described above, it is often advantageous to provide that an interior strengthening strut be formed between, and along the length of the interior convex surfaces at their point of closest approach. This makes the elements stronger and less likely to fracture if accidentally dropped. The strut is conveniently formed in the same extrusion operation forming the basic shape.

While the shape of the elements of the invention has been described as cylindrical, it is anticipated that the cross-sectional shape may vary along the length of the cylinder without departing from the essential concept of the invention. Thus the cylinder may be slightly tapered or be formed with a "waist" with the greatest cross-sectional dimension having a minimum at about the midpoint of the length. It should be recalled however that such departures may increase the pressure drop from one end of the bed to the other and perhaps alter the packing of the elements in the bed. Such deviations are therefore tolerable only to the extent that they do not significantly diminish the effectiveness of the element for its primary purpose.

The ends of the element along the axis can be formed with the wall ends shaped to conform to theoretical curved surfaces that are convex or, more preferably, concave. Thus, in preferred embodiments, the ends of the elements are hollowed such that the axial length is less than the length at the periphery. The extent of the hollowing is can be such the axial length along the axis is from about 60% to about 90%, and more usually about 75%, of the axial length at the periphery.

The material from which the cylinder is made may be any of those typically used for such purposes. Thus the preferred material is a ceramic or fired clay material though other materials such as a glass or metal could be used in certain applications. Generally the material should be inert to the fluid to which it will be exposed. Where heat transfer uses are involved, it should also be capable of absorbing heat in the amounts required by the process. It should also be capable of withstanding both thermal and physical shock during loading and use.

DESCRIPTION OF PREFERRED EMBODIMENTS

The invention is now described with reference to the drawings which are for the purpose of illustration only and are intended to imply no essential limitation on the scope of the invention claimed particularly in the matter of dimensions.

Figure 1:
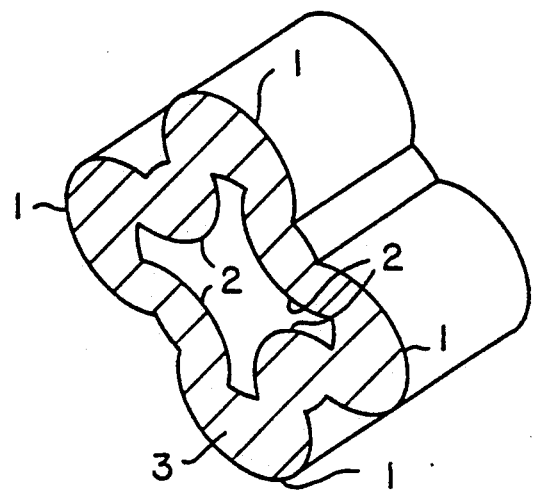
FIG. 1 is a perspective view of a first element according to the invention.

In FIG. 1 of the Drawings, the cylindrical element has four equal sized external lobes. The internal surface has four equally spaced convexities. The greatest cross-sectional outside diameter of the element is 3.33 cm and the greatest length is 2.54 cm. At each end of the cylinder, the surfaces of the element are shaped to form part of a theoretical concave surface such that the opposed theoretical surfaces are separated by 1.91 cm at their closest approach on the axis of the element. The radius of curvature of the external lobes is 0.64 cm and that of the internal convexities is 0.60 cm. The external lobes are connected by convex surfaces with a radius of curvature of 1.03 cm and the internal lobes are connected by concave surfaces with a radius of curvature of 0.95 cm.

Figure 2:
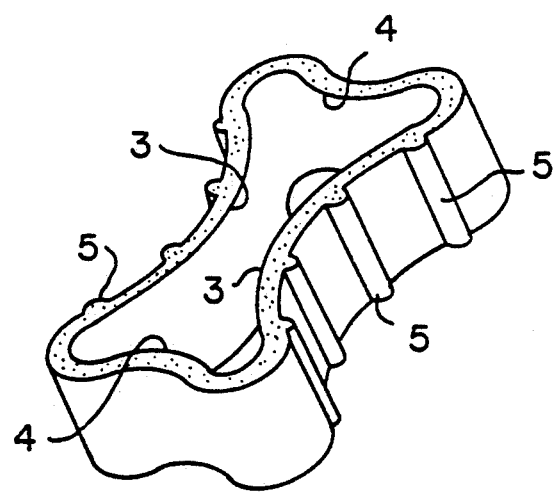
FIG. 2 shows a perspective view of a second embodiment.

FIG. 2 illustrates an embodiment in which the thickness of the wall of the cylindrical element remains essentially constant and in which the internal surface is provided with convexities of different radii of curvature with one opposed pair, at opposite ends of a first diameter, having the same, (greater), convexity and the other opposed pair at the ends of a second diameter at right angles to the first, having a lesser degree of convexity.

The outer surfaces of the greater internal convexities are each provided with four equally spaced axially extending ribs.

The radii of curvature of the greater of the internal convexities are 2.31 cm and the radii of curvature of the lesser convexities are 1.17 cm. The axial length of the element is 1.42 cm, the wall thickness is 0.28 cm and the greatest separation between the outside surfaces of adjacent lobes is 5.31 cm.

Figure 3:
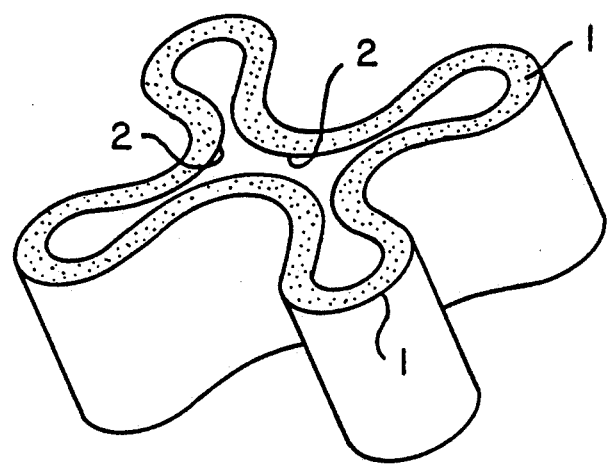
FIG. 3 shows a perspective view of a third embodiment.

FIG. 3 shows a structure similar to that of FIG. 2 but with more pronounced external lobes and with internal convexities that are not quite so different. The structure also lacks the external axial ribs.

The two larger opposed internal convexities have radii of curvature of 1.25 cm, (0.89 cm is the radius of curvature of the opposed concave surface), and the smaller have radii of curvature of 0.89 cm, (0.53 cm is the radius of curvature of the opposed concave surface). The wall thickness is 0.36 cm and the axial length is 1.42 cm. The greatest separation between outside surfaces of adjacent lobes is 4.37 cm.

Figure 4:
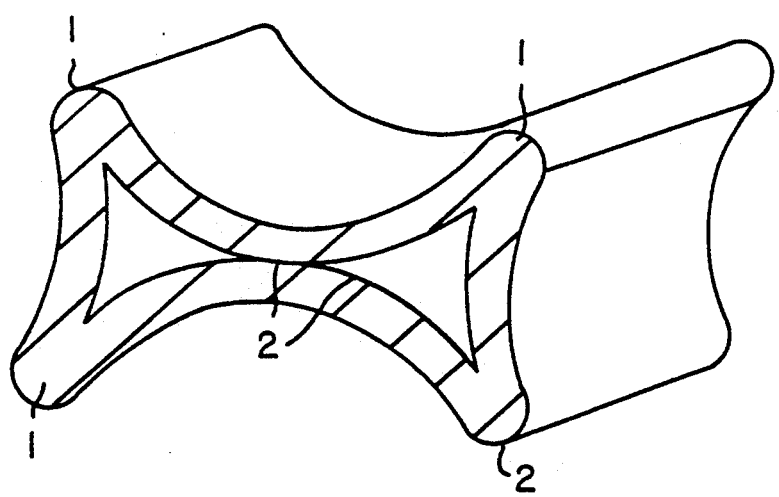
FIG. 4 shows a perspective view of a fourth embodiment.

FIG. 4 is like the embodiment of FIG. 3 except that the greater internal convexities are so large that they meet at the element axis.

In this embodiment the radii of curvature of all the external surfaces corresponding to the internal convexities are 1.91 cm however one opposed pair are so pronounced that the internal surfaces meet. The axial length of the element is 1.91 cm and the wall thickness is 0.95 cm.

What is claimed is:

1. A mass transfer element having a generally deformed cylindrical structure in which the cylinder wall has been inwardly deformed at opposed ends of mutually perpendicular diameters to provide a cross-section with external lobes, in which the ratio of the lengths of the mutually perpendicular diameters after said deformation is from about 2:1 to about 4:1.

2. An element according to claim 1 in which the extent of deformation at opposed ends of the same diameter is the same.

3. An element according to claim 1 in which the four external lobes are of essentially the same dimensions.

4. An element according to claim 1 having a plurality of axially extending ribs formed on the external surface of the cylinder.

5. An element according to claim 1 in which an internal strengthening strut is formed connecting opposed convex internal surfaces of the element.

6. An element according to claim 1 in which the ends of the cylinder are shaped to conform to theoretical concave surfaces such that the axial length of the element is shortest along its axis.

* * * * *